(12) United States Patent
Chino et al.

(10) Patent No.: US 11,843,848 B2
(45) Date of Patent: Dec. 12, 2023

(54) CONTROL APPARATUS FOR CONTROLLING EXPOSURE AND METHOD FOR CONTROLLING THE SAME

(71) Applicant: CANON KABUSHIKI KAISHA, Tokyo (JP)

(72) Inventors: Shunsuke Chino, Saitama (JP); Toshiyuki Dobashi, Kanagawa (JP); Seiya Ohta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 17/467,336

(22) Filed: Sep. 6, 2021

(65) Prior Publication Data

US 2022/0078336 A1 Mar. 10, 2022

(30) Foreign Application Priority Data

Sep. 9, 2020 (JP) ................................ 2020-151515

(51) Int. Cl.
*H04N 23/611* (2023.01)
*H04N 7/18* (2006.01)
*H04N 23/71* (2023.01)
*H04N 23/72* (2023.01)

(52) U.S. Cl.
CPC ............ *H04N 23/611* (2023.01); *H04N 7/18* (2013.01); *H04N 23/71* (2023.01); *H04N 7/183* (2013.01); *H04N 23/72* (2023.01)

(58) Field of Classification Search
CPC ...... H04N 23/61; H04N 23/611; H04N 23/70; H04N 23/71; H04N 23/72; H04N 23/75; H04N 23/62; H04N 23/631; H04N 23/632; H04N 23/633; H04N 23/634; H04N 23/635; H04N 7/18; H04N 7/183
See application file for complete search history.

(56) References Cited

U.S. PATENT DOCUMENTS

| 8,300,136 | B2 * | 10/2012 | Yamasaki | G03B 13/36 |
| | | | | 348/346 |
| 10,051,174 | B2 * | 8/2018 | Miyazawa | H04N 23/73 |
| 2007/0147701 | A1 * | 6/2007 | Tanaka | H04N 23/71 |
| | | | | 348/E5.038 |
| 2012/0044400 | A1 * | 2/2012 | Okada | H04N 23/80 |
| | | | | 348/E5.045 |
| 2012/0147252 | A1 * | 6/2012 | Kunishige | H04N 23/667 |
| | | | | 348/E5.045 |

(Continued)

FOREIGN PATENT DOCUMENTS

JP 4567618 B2 10/2010

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

A control apparatus is operable to control capturing by an image capturing apparatus. The control apparatus comprises: a detection unit configured to detect a feature portion included in an image that was captured by the image capturing apparatus; and a determination unit configured to, based on a subject region that surrounds a subject including a feature portion detected by the detection unit, determine an exposure region for calculating an exposure. The determination unit determines the exposure region by extending the subject region in a first direction.

19 Claims, 11 Drawing Sheets

(56) References Cited

U.S. PATENT DOCUMENTS

| | | | | |
|---|---|---|---|---|
| 2013/0342750 A1* | 12/2013 | Foote | .................... | H04N 25/531 |
| | | | | 348/349 |
| 2014/0185875 A1* | 7/2014 | Tsuji | .................... | H04N 23/611 |
| | | | | 382/103 |
| 2014/0247374 A1* | 9/2014 | Murakami | ............ | H04N 23/635 |
| | | | | 348/222.1 |
| 2014/0333825 A1* | 11/2014 | Nakagawara | .......... | H04N 23/73 |
| | | | | 348/362 |
| 2014/0376813 A1* | 12/2014 | Hongu | ................. | H04N 23/611 |
| | | | | 382/118 |
| 2016/0155009 A1* | 6/2016 | Han | ........................ | H04N 23/64 |
| | | | | 382/173 |
| 2016/0295100 A1* | 10/2016 | Yokozeki | .............. | H04N 23/635 |
| 2017/0118405 A1* | 4/2017 | Song | ...................... | H04N 23/73 |
| 2017/0289441 A1* | 10/2017 | Zhang | .................. | G06V 40/165 |
| 2018/0249090 A1* | 8/2018 | Nakagawa | .............. | G06T 7/194 |
| 2020/0137281 A1* | 4/2020 | Omori | ................. | H04N 23/611 |
| 2021/0271868 A1* | 9/2021 | Omori | ................. | H04N 23/611 |

* cited by examiner

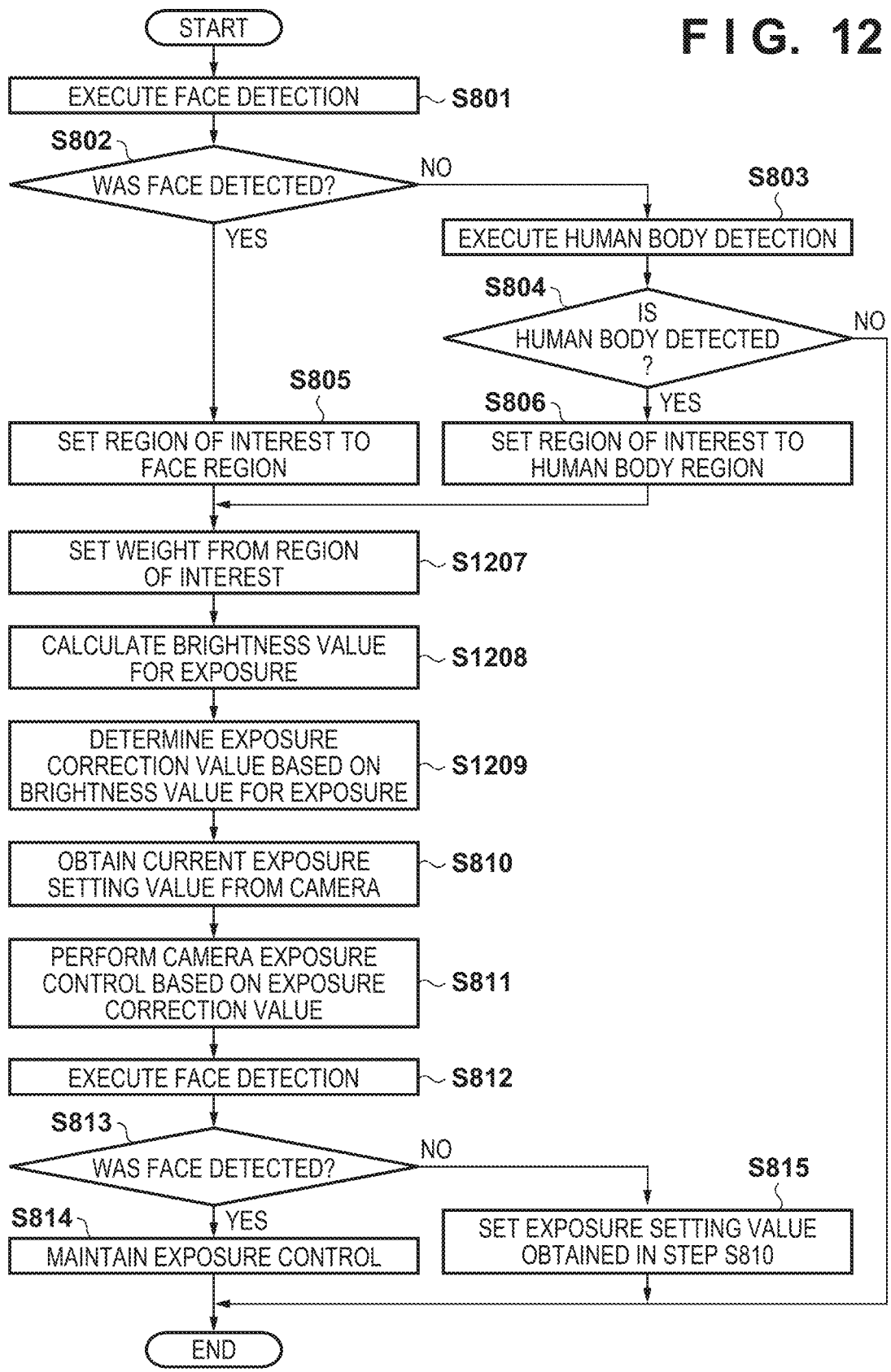

CONTROL APPARATUS FOR CONTROLLING EXPOSURE AND METHOD FOR CONTROLLING THE SAME

BACKGROUND OF THE INVENTION

Field of the Invention

The present invention relates to exposure control according to image capturing.

Description of the Related Art

Recently, techniques for detecting a specific region of the subject from the image captured by the image capturing apparatus, and setting image capturing settings such as exposure and image quality based on the information relating to the detected region have been proposed. For example, Japanese Patent No. 4567618 (PTL1) discloses a technique of detecting a predetermined target image portion from a subject image included in image data, and determining an automatic exposure (AE) target region for obtaining the brightness of the target image portion based on the detected target image portion.

However, in the technique of PTL1, since the AE target region is inside the target image portion (a face or the like), the area of the AE target region is narrow, and it is difficult to maintain stable exposure depending on the scene. For example, in a scene with a large amount of noise or a scene with a large amount of movement, exposure is unstable, and the obtained images will shift between being bright and being dark.

SUMMARY OF THE INVENTION

According to one aspect of the present invention, a control apparatus operable to control capturing by an image capturing apparatus, the control apparatus comprises: a detection unit configured to detect a feature portion included in an image that was captured by the image capturing apparatus; and a determination unit configured to, based on a subject region that surrounds a subject including a feature portion detected by the detection unit, determine an exposure region for calculating an exposure, wherein the determination unit determines the exposure region by extending the subject region in a first direction.

According to another aspect of the present invention, a control apparatus operable to control capturing by an image capturing apparatus, the control apparatus comprises: a detection unit configured to detect a feature portion included in an image that was captured by the image capturing apparatus; a determination unit configured to determine a weight distribution of an exposure calculation on a subject region that surrounds a subject including a feature portion detected by the detection unit; and a calculation unit configured to calculate an exposure value based on the weight distribution determined by the determination unit, wherein the determination unit determines the weight distribution by extending in a first direction an initial weight distribution set based on a section in which the subject is present.

The present invention enables stable exposure of a subject.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart of the exposure control process in the second embodiment.

DESCRIPTION OF THE EMBODIMENTS

Figure 1:
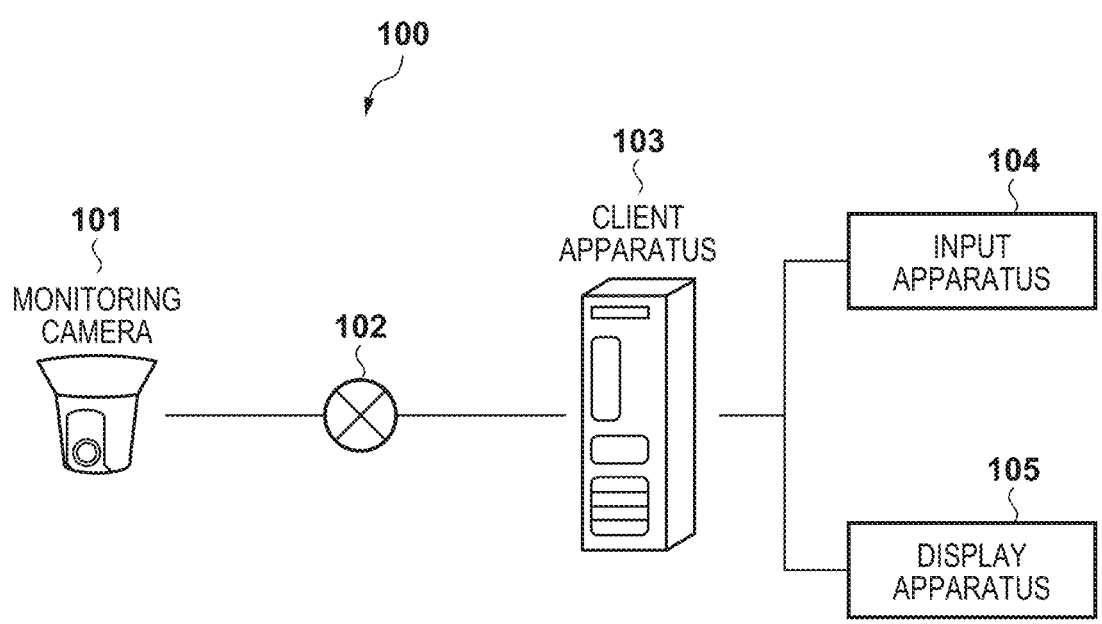
FIG. 1 is a block diagram showing an overall configuration of a capture control system according to a first embodiment.

Hereinafter, embodiments will be described in detail with reference to the accompanying drawings. The following embodiments do not limit the claimed invention. Although a plurality of features are described in the embodiments, not all of the plurality of features are essential to the present invention, and the plurality of features may be arbitrarily combined. Furthermore, in the accompanying drawings, the same reference numerals are assigned to the same or similar components, and a repetitive description thereof is omitted.

First Embodiment

As a first embodiment of a control apparatus according to the present invention, a client apparatus for controlling capturing by a monitoring camera will be described below as an example.

<System Configuration>

FIG. 1 is a block diagram exemplarily showing an overall configuration of a capture control system 100 according to a first embodiment.

A capture control system 100 includes a monitoring camera 101, a network 102, a client apparatus 103, an input apparatus 104, and a display apparatus 105. A monitoring camera 101 is an image capturing apparatus for obtaining a moving image, and is an apparatus capable of capturing a subject and performing image processing. The monitoring camera 101 and the client apparatus 103 are connected to each other via a network 102 in a mutually communicable state. The client apparatus 103 is communicably connected to the input apparatus 104 and the display apparatus 105. Since the client apparatus 103 is a device for processing various types of information, it may be referred to as an information processing apparatus. Further, since the client apparatus 103 is an apparatus for controlling capturing by the monitoring camera 101, it may be referred to as a control apparatus.

The input apparatus 104 includes a mouse, a keyboard, and the like, and is operated by a user operating the client apparatus 103. The display apparatus 105 is an apparatus including a monitor or the like for displaying an image received from the client apparatus 103. It is also possible to provide a touch panel on the surface of the display apparatus 105 for it to function as a graphical user interface (GUI). In this case, the display apparatus 105 can also function as an input apparatus for inputting instructions, information, data, and the like to the client apparatus 103.

In FIG. 1, the client apparatus 103, the input apparatus 104, and the display apparatus 105 are depicted as independent apparatuses, but the present invention is not limited to such a configuration. For example, the client apparatus 103 and the display apparatus 105 may be integrated, and the input apparatus 104 and the display apparatus 105 may be integrated. The client apparatus 103, the input apparatus 104, and the display apparatus 105 may be integrated. When the client apparatus 103 and the display apparatus 105 are integrated, the integrated apparatus takes the form of, for example, a personal computer, a tablet terminal, or a smart phone.

One or more of the functional blocks shown in FIG. 4, which will be described later, may be realized by hardware such as an application-specific integrated circuit (ASIC) and a programmable logic array (PLAs). A programmable processor such as a central processing unit (CPU) or MPU may be implemented by executing a software program. MPU is an abbreviation of Micro-Processing Unit. It may also be realized by a combination of software and hardware. Therefore, in the following description, even when different functional blocks are described as operating entities, the same hardware can be realized as a subject.

Hardware Configuration of the Monitoring Camera

Figure 2:
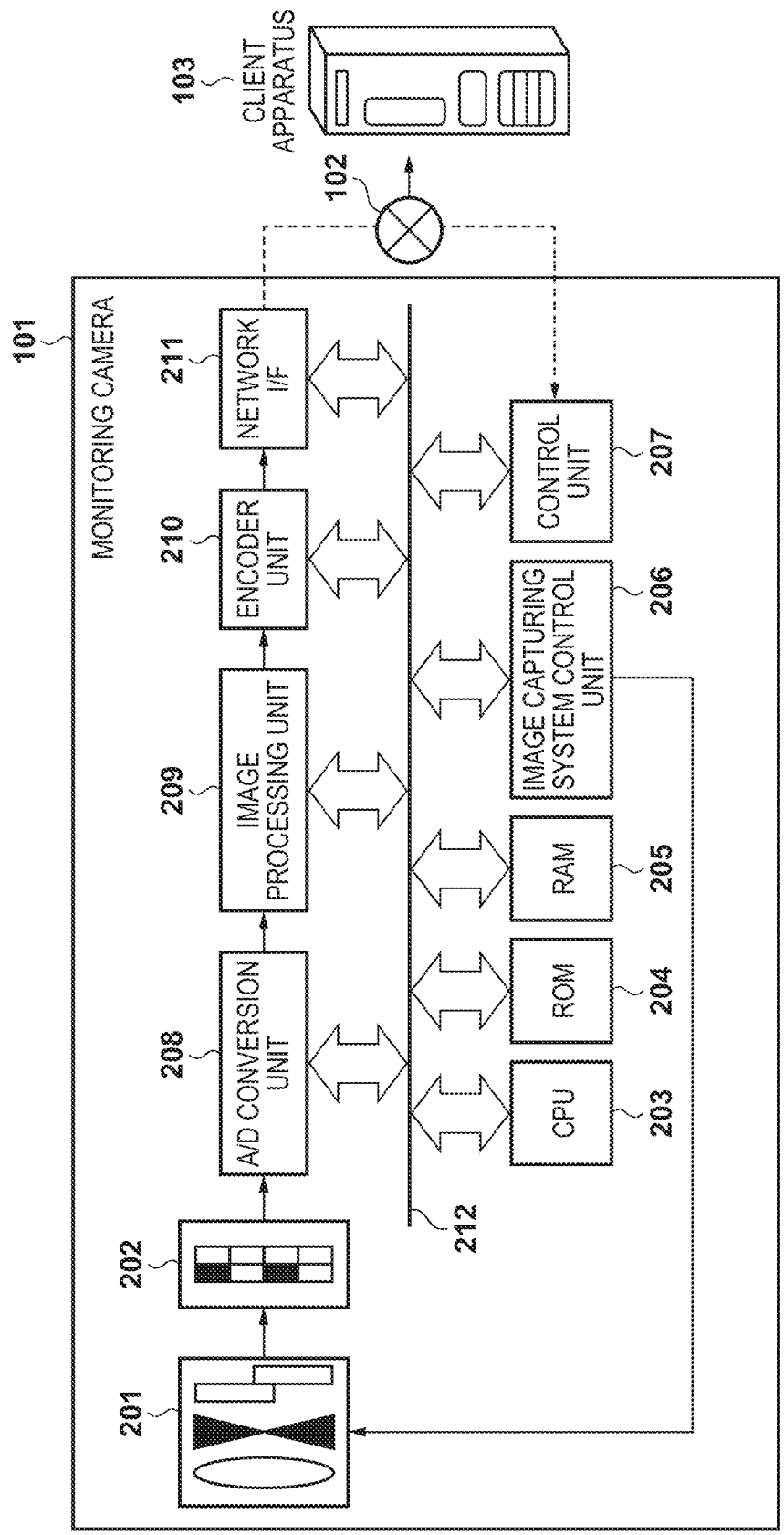
FIG. 2 is a block diagram showing a hardware configuration of a monitoring camera.

FIG. 2 is a block diagram showing a hardware configuration of the monitoring camera 101. The monitoring camera 101 includes an image capturing optical system 201 and an image-capturing element 202. The monitoring camera 101 includes a CPU 203, a ROM 204, a RAM 205, an image capturing system control unit 206, a communication control unit 207, an A/D conversion unit 208, an image processing unit 209, an encoder unit 210, and a network interface (I/F) 211. These elements are interconnected by a system bus 212. ROM is an abbreviation of Read Only Memory. RAM is an abbreviation of Random Access Memory. A/D is an abbreviation of Analog/Digital.

The image capturing optical system 201 is configured by a zoom lens, a focus lens, an image stabilization lens, an aperture, a shutter, and the like, and is an optical member group for focusing light of a subject. The image capturing optical system 201 is connected to the image-capturing element 202 so that the optical image to be imaged by the image capturing optical system 201 is guided to the image-capturing element 202.

The image-capturing element 202 is a charge-storage-type solid-state image capturing element such as a CMOS or CCD for converting the optical image focused by the image capturing optical system 201 to a current value (signal value). For example, color information can be obtained by combining with a color filter or the like. CMOS is an abbreviation of Complementary Metal Oxide Semiconductor. CCD is an abbreviation of Charge-Coupled Device. The image-capturing element 202 is connected to the A/D converter 208.

The CPU 203 is a control unit that comprehensively controls the operation of the monitoring camera 101. The CPU 203 reads the instruction stored in the ROM 204 or the RAM 205 and executes the process accordingly.

The image capturing system control unit 206 controls each unit of the monitoring camera 101 based on an instruction from the CPU 203. For example, the image capturing system control unit 206, with respect to the image capturing optical system 201, the focus control, shutter control, performs control such as aperture adjustment.

The communication control unit 207 performs control for transmitting a control command (control signal) from the client apparatus 103 to each unit of the monitoring camera 101 to the CPU 203 by communication with the client apparatus 103.

The A/D conversion unit 208 converts the optical image detected by the image-capturing element 202 into a digital signal (image data). The A/D conversion unit 208 transmits the obtained digital signal to the image processing unit 209. The image processing unit 209 performs various image processing on the image data of the digital signal received from the image-capturing element 202. The image processing unit 209 is connected to the encoder unit 210. The encoder unit 210 converts the image data processed by the image processing unit 209 into a file format such as Motion JPEG or H.264 or H.265. The encoder unit 210 is connected to a network I/F 211.

The network I/F 211 is an interface used for communication with an external device such as the client apparatus 103 via the network 102, and is controlled by the communication control unit 207.

The network 102 is a network that connects the monitoring camera 101 and the client apparatus 103. The network 102 is configured by a plurality of routers, switches, cables, and the like that conform to a communication standard such as Ethernet (registered trademark). However, the network 102 may be any network capable of performing communication between the monitoring camera 101 and the client apparatus 103, and may have any communication standard, scale, configuration, or the like. For example, the network 102 may include the Internet, a wired LAN (Local Area Network), a wireless LAN, a WAN (Wide Area Network), or the like.

Client Device Hardware Configuration

Figure 3:
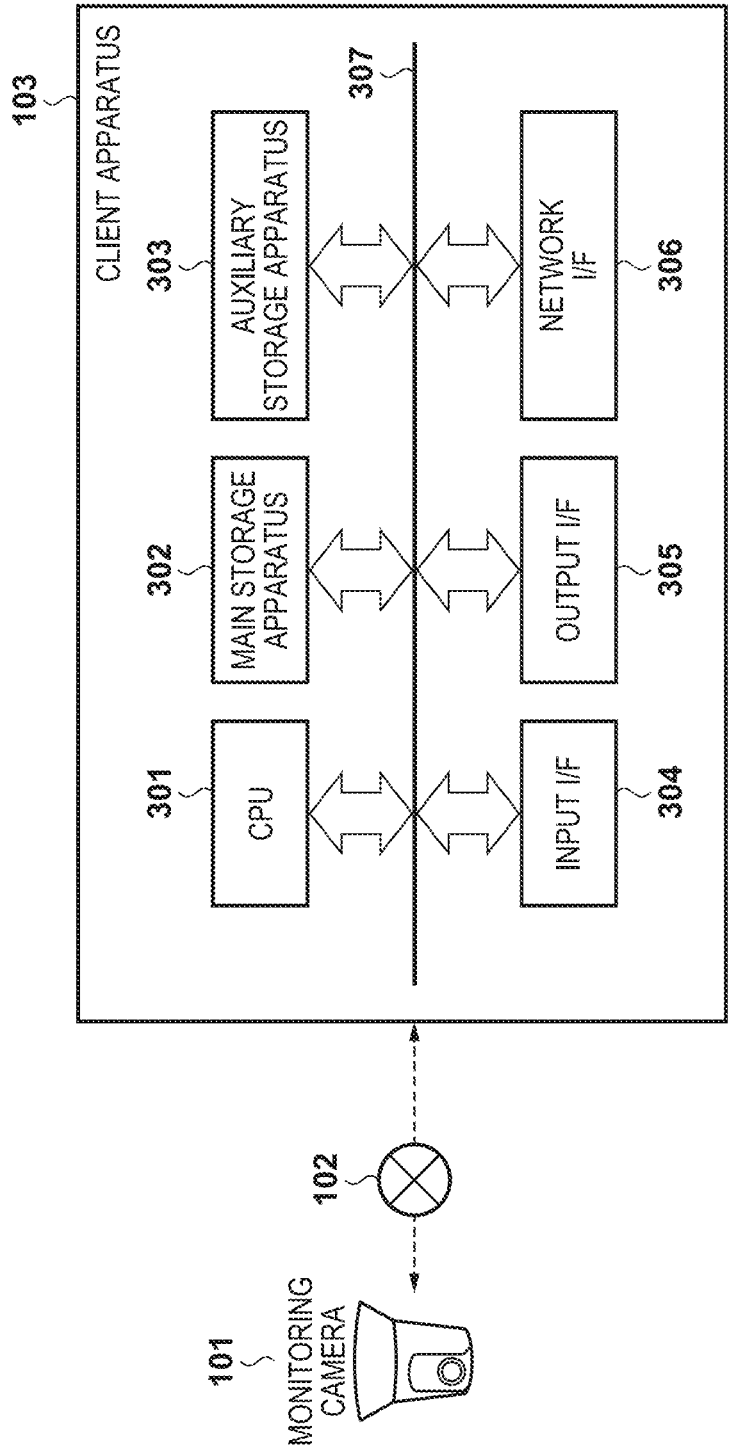
FIG. 3 is a block diagram showing a hardware configuration of a client apparatus.

FIG. 3 is a block diagram showing a hardware configuration of the client apparatus 103. The client apparatus 103 includes a CPU 301, a main storage apparatus 302, an auxiliary storage apparatus 303, an input I/F 304, an output I/F 305, and a network I/F 306. Each of these elements is connected via a system bus 307 so as to be able to mutually communicate.

The CPU 301 is a central processing unit that comprehensively controls the operation of the client apparatus 103. Incidentally, the CPU 301 may perform overall control of the monitoring camera 101 via the network 102.

The main storage apparatus 302 is a storage device such as a RAM that functions as a temporary storage location for data of the CPU 301. For example, the main storage apparatus 302 is used to store a pattern for pattern matching used when the client apparatus 103 performs face detection or human body detection (a pattern corresponding to a characteristic portion of a face or a characteristic portion of a human body).

The auxiliary storage apparatus 303 is a storage device such as an HDD, a ROM, or an SSD that stores various programs, various setting data, and the like. HDD is an abbreviation of Hard Disk Drive. SSD is an abbreviation of Solid State Drive.

The input I/F 304 is an interface used when the client apparatus 103 receives an input (signal) from the input apparatus 104 or the like. The output I/F 305 is an interface used when the client apparatus 103 outputs information (a signal) to the display apparatus 105 or the like. The network I/F 306 is an interface used for communication with external devices such as the monitoring camera 101 via the network 102.

Client Apparatus Functional Configuration

Figure 4:
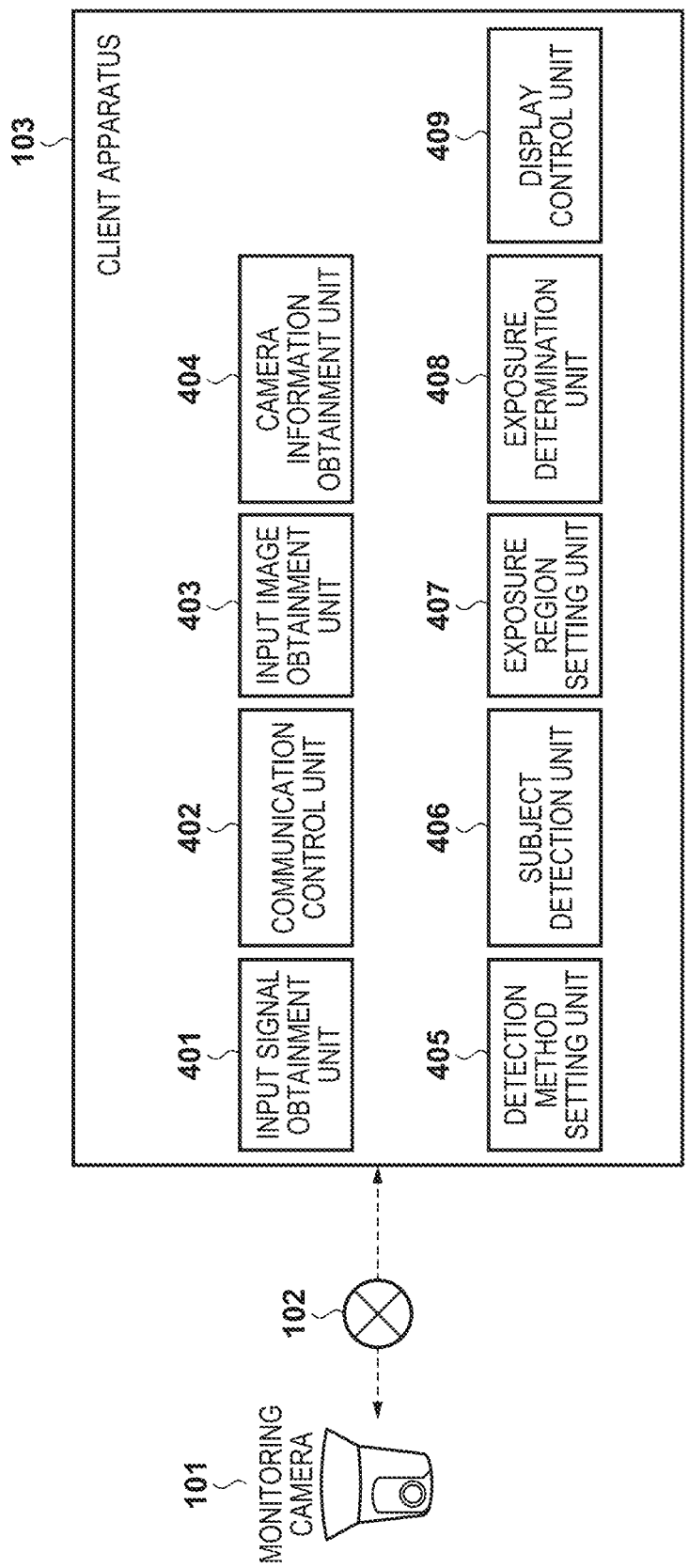
FIG. 4 is a block diagram showing a functional configuration of a client apparatus.

FIG. 4 is a block diagram showing a functional configuration of a client apparatus 103. Various functions of the client apparatus 103 are realized by the CPU 301 executing a process based on a program stored in the auxiliary storage apparatus 303. In other words, each functional unit illustrated in FIG. 4 is for a function that can be executed by the CPU 301, and each unit may be realized by the CPU 301. However, each functional unit shown in FIG. 4 may be implemented by hardware (or software) other than the CPU 301.

The client apparatus 103 includes an input signal obtainment unit 401, a communication control unit 402, an input image obtainment unit 403, a camera information obtainment unit 404, and a detection method setting unit 405. The client apparatus 103 includes a subject detection unit 406, an exposure determination unit 408, and a display control unit 409.

The input signal obtainment unit 401 receives an input from the user via the input apparatus 104. The communication control unit 402 executes control for receiving an image transmitted from the monitoring camera 101 (that is, an image captured by the monitoring camera 101) via the network 102. In addition, the communication control unit 402 executes control for transmitting a control command from the client apparatus 103 to the monitoring camera 101 via the network 102.

The input image obtainment unit 403 obtains an image received from the monitoring camera 101 via the communication control unit 402 as an image to be subjected to detection processing of a subject. Details of the detection processing will be described later. The camera information obtainment unit 404 via the communication control unit 402 obtains camera information (image capturing information) for a time of capturing a subject by the monitoring camera 101. The camera information includes various information of a time of obtaining an image by capturing a subject, exposure parameters such as an aperture value, a shutter speed, and gain, for example. An exposure correction value for changing an exposure target value to be used at a time of AE (Auto Exposure) is also included.

The detection method setting unit 405 sets a predetermined (appropriate) method for detection performed on the image obtained by the input image obtainment unit 403, among various detection methods, including detection of a face region (face detection) and detection of a human body region (human body detection). Here, the human body detection need not necessarily detect the whole body, and may detect from the waist up, from the chest up, or a head region including a face.

Here, the detection method setting unit 405 sets (selects) a detection method for face detection or a detection method for human body detection, but is not limited to such a setting. For example, a detection method for detecting a feature region of a part of a person such as a partial region of the body from the waist up, the head, the eyes, the nose, the mouth, or the like of the person may be set (selected). In addition, here, the subject to be detected is a person, but e configuration may be such that it is possible to detect a specific region relating to a predetermined subject other than the person. For example, a configuration may be adopted in which a predetermined subject set in advance in the client apparatus 103, such as an animal's face or an automobile, can be detected.

When the face detection is set by the detection method setting unit 405, the subject detection unit 406 preferentially detects the face region in the image. When human body detection is set by the detection method setting unit 405, a human body region is preferentially detected in the image. The coordinates (vertex coordinates, width, height, etc.) of the detected face region and human body region are calculated.

An exposure region setting unit 407 sets an exposure region as an AE target based on the face region and the human body region calculated by the subject detection unit 406. The setting of the exposure region will be described later with reference to FIGS. 5 to 7.

An exposure determination unit 408, based on the image information of the subject region obtained from the exposure region set by the exposure region setting unit 407, determines the exposure level, and the aforementioned exposure level is transmitted to the monitoring camera 101 by the communication control unit 402, and via the control unit 207, the exposure control is executed. In the method of adjusting the exposure level, at least one of the parameters that affect the exposure such as the aperture value, shutter speed, gain, and exposure correction value may be used.

In accordance with an instruction from the CPU 301, the display control unit 409 outputs a captured image in which the exposure correction determined by the exposure determination unit 408 is reflected to the display apparatus 105.

<Control of Exposure Region>

Next, the details of the setting of the exposure region in the exposure region setting unit 407 will be described with reference to FIGS. 5 to 7. Here, the exposure region means a region to be subjected to the exposure calculation in the AE.

Figure 5:
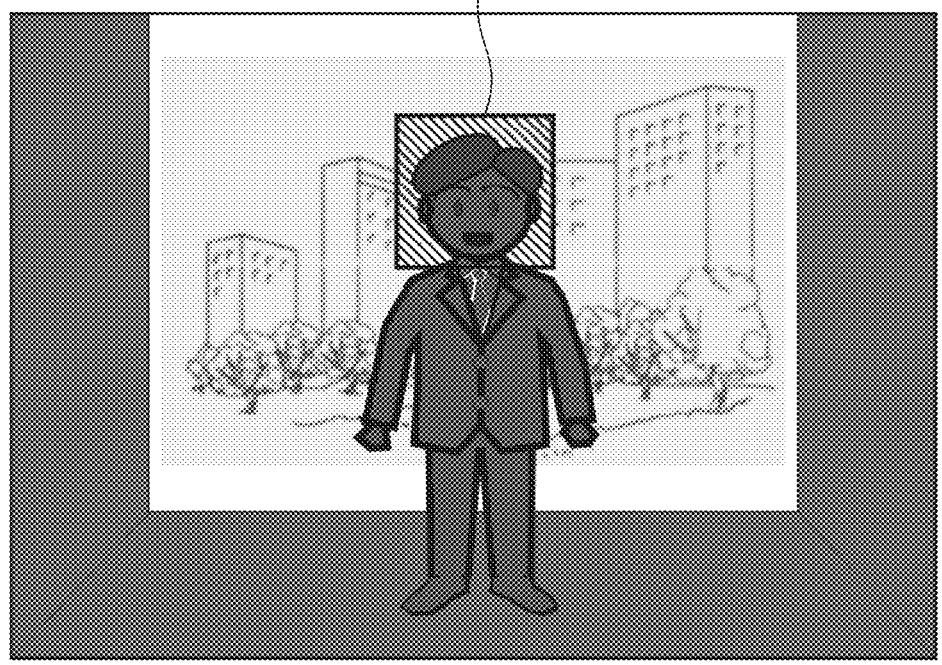
FIG. 5 is a diagram illustrating an example of a captured image in which a human body region has shadow-detail loss due to insufficient exposure.

FIG. 5 is a diagram illustrating an example of a captured image in which a human body region has shadow-detail loss due to insufficient exposure. Such a captured image can be obtained when capturing in a direction of a bright outdoor scene from a dark place such as indoors. That is, when a subject that is indoors (in a dark place) is captured, the subject is in a backlit state, specifically there is shadow-detail loss due to insufficient exposure (underexposure) of the face or human body.

When it is desired to adjust the exposure to the face region or the human body region, it is necessary to appropriately set the exposure region. Here, the frame calculated by the subject detection unit 406 is a rectangular region including the head of the person as shown in FIG. 5. However, as indicated by the hatched region in FIG. 5, the frame is larger and the position is shifted. In this case, the portion of the hatched region that is not the face region or the human body region has a large impact, and there are cases where the exposure of the face region or the human body region will not be appropriate. Further, merely decreasing the exposure region (when a part of the face region or the human body region) narrows the exposure region, and the brightness of the face region or human body region will not be stable in a scene where there is a lot of noise or movement. As a result, the exposure may vary between a state in which the exposure is adjusted to the background of the human body region (FIG. 5) and a state in which the exposure is adjusted to the human body region (FIG. 6).

Figure 6:
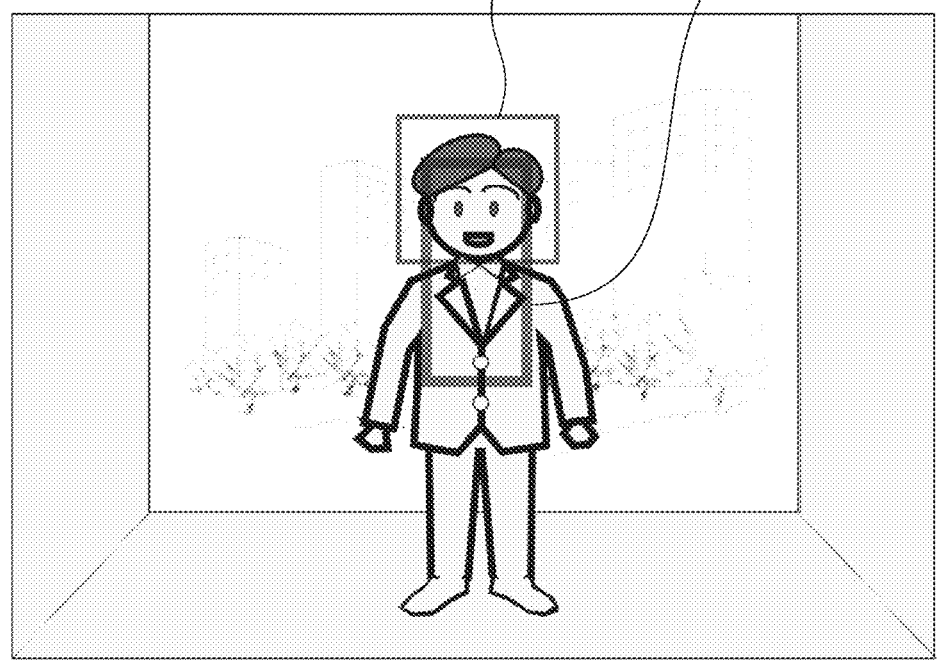
FIG. 6 is a view illustrating an example of a captured image where the human body region is properly exposed.

FIG. 6 is a view illustrating an example of a captured image where a human body region is properly exposed. In order to suppress fluctuation of the exposure as described above and to adjust the exposure of the face region or the human body region with high accuracy, it is conceivable to set the exposure region as shown in FIG. 6. That is, if the main subject is a person, one side among of the four sides of the frame (face, human body region) calculated by the subject detection unit 406 is moved in a direction where a lower body of the person is present so that a neck or chest of the person is included.

Thus, the exposure region can be set to the main subject (person) without including the background such as the shaded portion of FIG. 5. And, since it is possible to increase the area of the exposure region, it is possible to realize a stable exposure even in a scene with a lot of noise and movement. Further, when a larger region is calculated from the subject detection unit 406, the width of the face or the human body in the lateral direction is reduced, and the exposure can be accurately aligned with respect to the face region or the human body region by displacement in a direction in which the main subject is present. In FIG. 6, all the remaining three sides are moved in the center direction (the region surrounded by the frame is reduced) but configuration may be such that only one side is moved. In some cases, configuration may be such that the remaining three sides are not moved.

In order to realize stable exposure, it is conceivable that the minimum area of the exposure region is set in advance so as to be equal to or larger than the set minimum area. The minimum area may still be changed according to the degree of movement of the subject and the amount of noise. Further, in order to reduce the influence of the color of the clothes and to adjust the exposure to the face region or the human body region, the position of the neck or the shoulder may be detected and the exposure region may be extended to the region. In order to appropriately expand the region regardless of whether it is an adult, a child, or the like, the region may be expanded in proportion to the size of the face region or the human body region.

Figure 7:
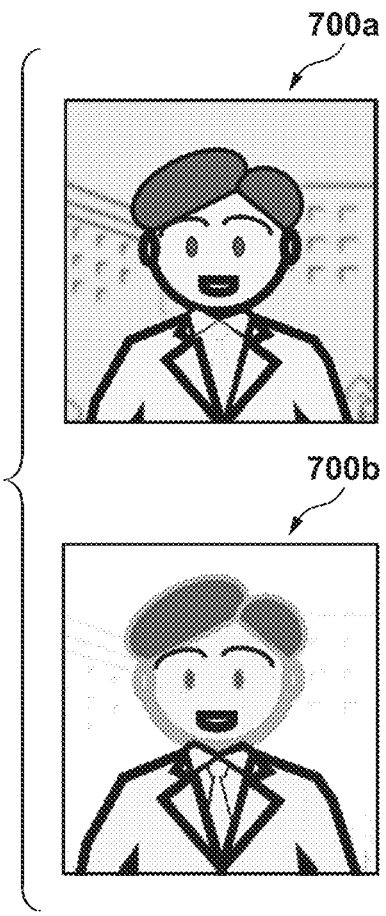
FIG. 7 is a diagram showing an example of captured images having a different degree of backlight.

FIG. 7 is a diagram showing an example of captured images having a different degree of backlight. Both the image 700a and the image 700b show a captured image in which appropriate exposure is obtained for the face region. However, the image 700a shows an example of when backlight is not so intense, and the image 700b shows a captured image for which the backlight is rather intense. When the backlight is intense as in the image 700b, the saturation region may leak into the face region or the human body region due to optical flare or sensor leakage.

In the case of the image 700b, the width of the exposure region of the face or the human body in the lateral direction may be set to be relatively narrower than that of the image 700a. That is, a backlight decision for deciding the degree of backlight in the captured image is performed, and the degree of reduction is increased as the degree of backlight increases. However, since the area of the exposure region is narrowed by this, the amount of extension in the direction in which the torso is present may also be increased. For example, the exposure region may be determined so as to have substantially the same area as the subject region, which is a frame calculated by the subject detection unit 406.

When the subject detection unit 406 detects the face region, the torso often is vertically downward from the face region. Therefore, the exposure region may be extended in a direction corresponding to the vertically downward direction in the captured image. In addition, the direction in which the main subject is present may be decided from the positional relationship between the face region and the human body region. For example, the face region and the human body region are compared, and the direction that protrudes greatly becomes the torso region of the human body. Therefore, the direction in which the main subject is present becomes the direction of the torso region.

<Operation of the Apparatus>

Figure 8:
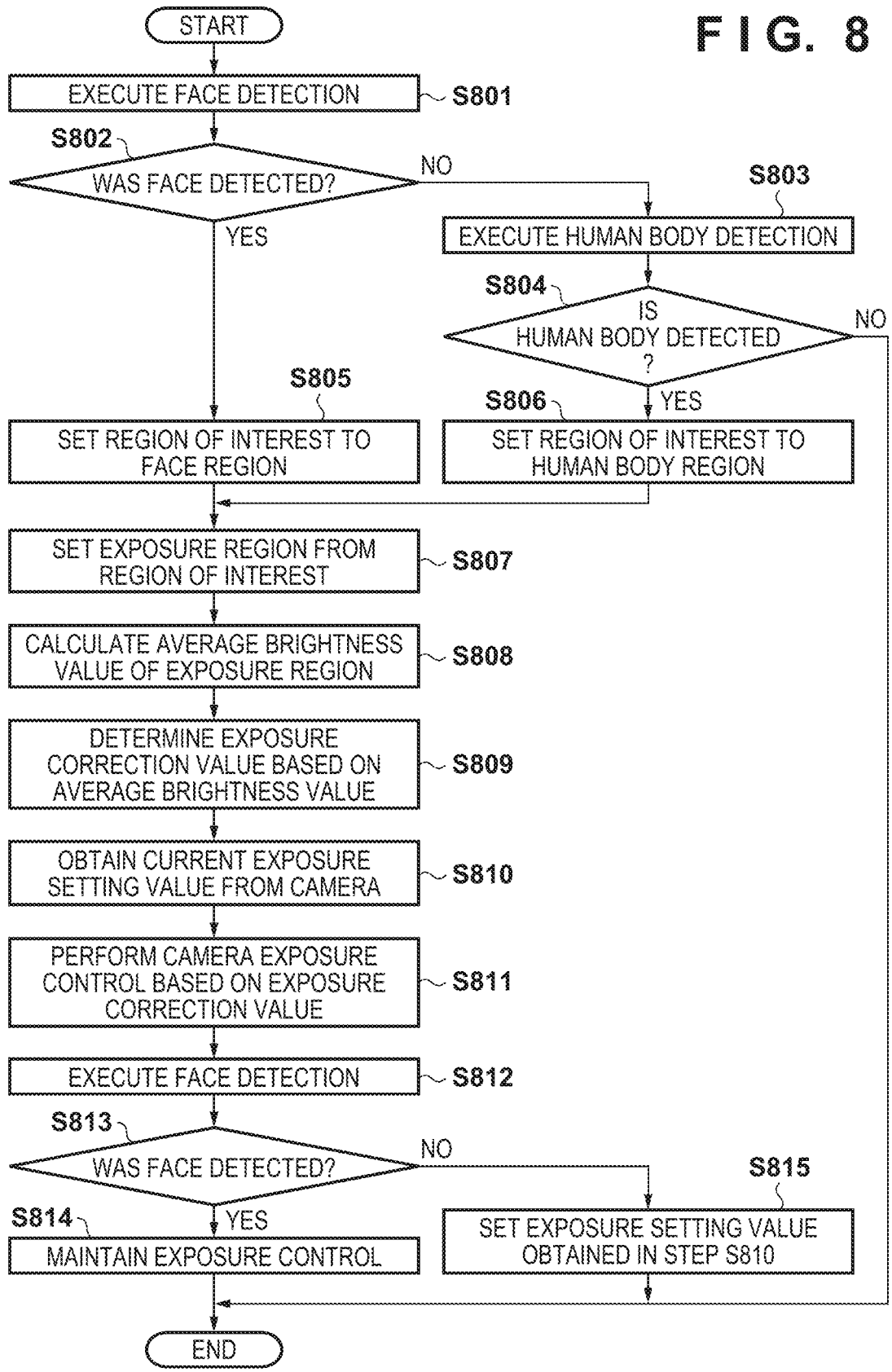
FIG. 8 is a flowchart of the exposure control process in the first embodiment.

FIG. 8 is a flowchart of the exposure control process in the first embodiment. Here, in particular, the detection processing and the exposure determination processing of the subject are described. The processing of this flowchart is started in response to the input of the captured image of the subject from the monitoring camera 101 to the client apparatus 103 via the network 102.

In the capture control system 100, it is assumed that the power of the monitoring camera 101, the client apparatus 103, the input apparatus 104, and the display apparatus 105 is turned on, and the connection (communication) between the monitoring camera 101 and the client apparatus 103 is established. In addition, it is assumed that the capturing of the subject by the monitoring camera 101, the transmission of the image data from the monitoring camera 101 to the client apparatus 103, and the displaying of an image by the display apparatus 105 are repeated in a predetermined update cycle.

In step S801, the detection method setting unit 405 sets face detection in the subject detection unit 406, and the subject detection unit 406 performs a face detection process on the input image. The main storage apparatus 302 of the client apparatus 103 stores in advance respective patterns corresponding to the characteristic portions of the face and the characteristic portions of the human body, and the subject detection unit 406 detects a face region included in the captured image by pattern matching based on the patterns.

In step S802, the subject detection unit 406 decides whether a face region is detected in the image in the face detection process executed in step S801. If no face region is detected, the process proceeds to step S803, and if at least one or more face regions are detected, the process proceeds to step S805.

Figure 10:
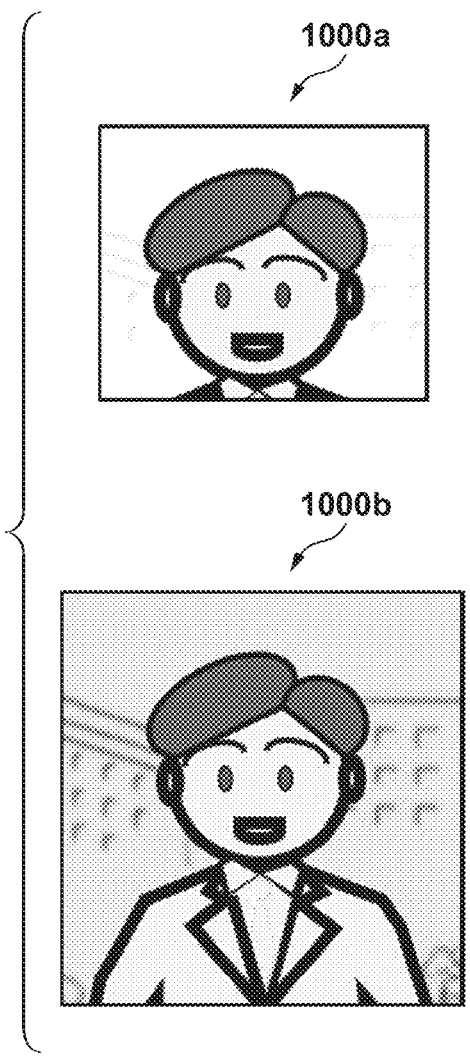
FIG. 10 is a view illustrating examples of captured images where a face and a human body region are detected.

In step S803, the detection method setting unit 405 sets human body detection in the subject detection unit 406, and the subject detection unit 406 performs a human body detection process on the input image. Here, when a face region is detected, generally, a face can be detected with high accuracy, and a face region of a subject and a region other than the face region can be clearly identified. However, if conditions regarding the facial direction, the size of the face, the brightness of the face, or the like are not suitable for facial detection, the face region cannot be accurately detected. On the other hand, when performing a human body detection, it is possible to detect a region in which a person exists regardless of the direction of the face, the size of the face, the brightness of the face, etc. As described above, the human body detection need not necessarily detect the whole body, and may detect from the waist up, from the chest up, or a head region including a face. FIG. 10 shows an example in which a face region and a human body region are detected.

Further, when employing a pattern matching method as a method for detecting a subject, a pattern created using statistical learning (discriminator) may be used as a pattern to be used in the pattern matching. Alternatively, subject detection may be performed by a method other than pattern matching. For example, subject detection may be performed using a brightness gradient in a local region. That is, the method for detecting the subject is not limited to a specific detection method, and various methods such as detection based on machine learning and detection based on distance information can be adopted.

In step S804, the subject detection unit 406 decides whether a human body region is detected in the image the human body detection process executed in step S803. When the human body region is not detected, the process ends, and when the human body region is detected, the process proceeds to step S806.

In step S805, the exposure determination unit 408 sets the region of interest used in the subsequent step S808 as the face region detected in step S801. On the other hand, in step S806, the exposure determination unit 408 sets the region of interest used in the subsequent step S808 as human body region detected in step S803.

In step S807, an exposure region is set from the set target region. In step S808, the exposure determination unit 408 calculates the average brightness value of the exposure region set in step S807. Specifically, the exposure determination unit 408 calculates the number of regions of interest (the number of detected faces or human bodies), the position of the regions of interest, and the size of the regions of interest, which are set by step S805 or step S806, by applying the information to Equation (1).

$$\bar{I}_{object} = \frac{1}{f}\sum_{s=1}^{f}\left\{\frac{1}{k_s \times l_s}\sum_{i=-k_s/2}^{k_s/2} \cdot \sum_{j=-l_s/2}^{l_s/2} I(v_s + i, h_s + j)\right\} \quad (1)$$

Here, I (x, y) represents the brightness value of the two-dimensional coordinate position in the horizontal direction (x-axis direction) and the vertical direction (y-axis direction) in the image (x, y). In addition, s represents an index of a region of interest, and f represents the number of regions of interest. (v, h) represents the center coordinates of the region of interest, k represents the size of the region of interest in the horizontal direction, and l represents the size of the region of interest in the vertical direction.

In step S809, the exposure determination unit 408 determines the correction amount $EV_{correction}$ of the exposure based on the average brightness value calculated in step S808. First, the exposure determination unit 408 calculates the difference value ΔDiff between the average brightness value $I_{object}$ of the region of interest calculated in step S808 and the target brightness value $I_{object\ target}$ of the region of interest as in Equation (2). The target brightness value $I_{object\ target}$ of the region of interest may be arbitrarily set by the user, for example, or may be set to a value that increases the accuracy in light of the authentication accuracy at the time of facial authentication.

$$\Delta Diff = I_{object\ target} - I_{object} \quad (2)$$

Next, the exposure determination unit 408 determines the correction amount $EV_{correction}$ as shown in Equation (3). Incidentally, $EV_{current}$ is an EV value of an APEX conversion based on a subject brightness value (BV value), which is stored in advance in the client apparatus 103, and is set based on a program diagram relating to the exposure control.

$$EV_{correction} = \begin{cases} EV_{current} - \beta & \text{(if } \Delta Diff < -Th) \\ EV_{current} & \text{(if } -Th \leq \Delta Diff \leq -Th) \\ EV_{current} + \beta & \text{(if } Th < \Delta Diff) \end{cases} \quad (3)$$

Here, the parameter β is a coefficient which centered around the current exposure value $EV_{current}$, applies an effect to a correction degree (velocity) when the exposure is corrected toward underexposure or overexposure. By setting a larger value of the parameter β, the processing speed (or time) according to the time to reach the target value becomes high, but the brightness of the entire screen varies steeply when an erroneous decision occurs in the detection result or when the detection of the subject is not stable. On the other hand, when the value of the parameter β is set to a small value, the processing speed (or time) required for the exposure to reach the target is slower, but it becomes robust to false detection and photographing conditions. The parameter β is set as a correction value for exposure with respect to the current exposure value $EV_{current}$ when the difference ΔDiff is equal to or larger than the set threshold Th.

In step S810, the camera information obtainment unit 404 obtains the information of the current exposure setting value from the camera. This obtains the exposure correction value. In step S811, the exposure determination unit 408 communicates with the monitoring camera 101 via the communication control unit 402 and sets the exposure correction value calculated in step S809 to the monitoring camera 101.

In step S812, the subject detection unit 406 performs face detection in the same manner as in step S801. In step S813, the subject detection unit 406 decides whether a face region is detected in the image in the face detection process executed in step S812. If no face region is detected, the process proceeds to step S814, and if at least one or more face regions are detected, the process proceeds to step S815.

In step S814, the exposure determination unit 408 communicates with the monitoring camera 101 via the communication control unit 402, sets the exposure correction value set in step S811 to the monitoring camera 101 so as to maintain the exposure correction value, and ends the present processing. On the other hand, in step S815, the exposure determination unit 408 communicates with the monitoring camera 101 via the communication control unit 402, sets the exposure correction value calculated in step S810 to the monitoring camera 101, and ends the present processing.

As described above, according to the first embodiment, an appropriate exposure region is set from the face region or the human body region, and exposure control is performed based on the exposure region. In particular, the size of the exposure region (exposure frame) to be the target of AE is changed in accordance with the state of the subject in the captured image. This makes it possible, for example, to stably set an appropriate exposure control value for face detection even in the case of a strong backlight state, such as a store entrance or a stadium gate employing a glass door. Therefore, the face detection can be stably performed, and the face of a shop visitor or an attendee subject (person) can be quickly taken.

Second Embodiment

In the second embodiment, a mode in which exposure control is performed by setting a weight for a region in a frame detected by the subject detection unit 406 will be described.

<System Configuration>

The overall configuration of the system according to the second embodiment and the hardware configurations of the monitoring camera 101 and the client apparatus 103 are the same as those of the first embodiment (FIGS. 1 to 3). Therefore, detailed description is omitted.

Client Apparatus Functional Configuration

Figure 9:
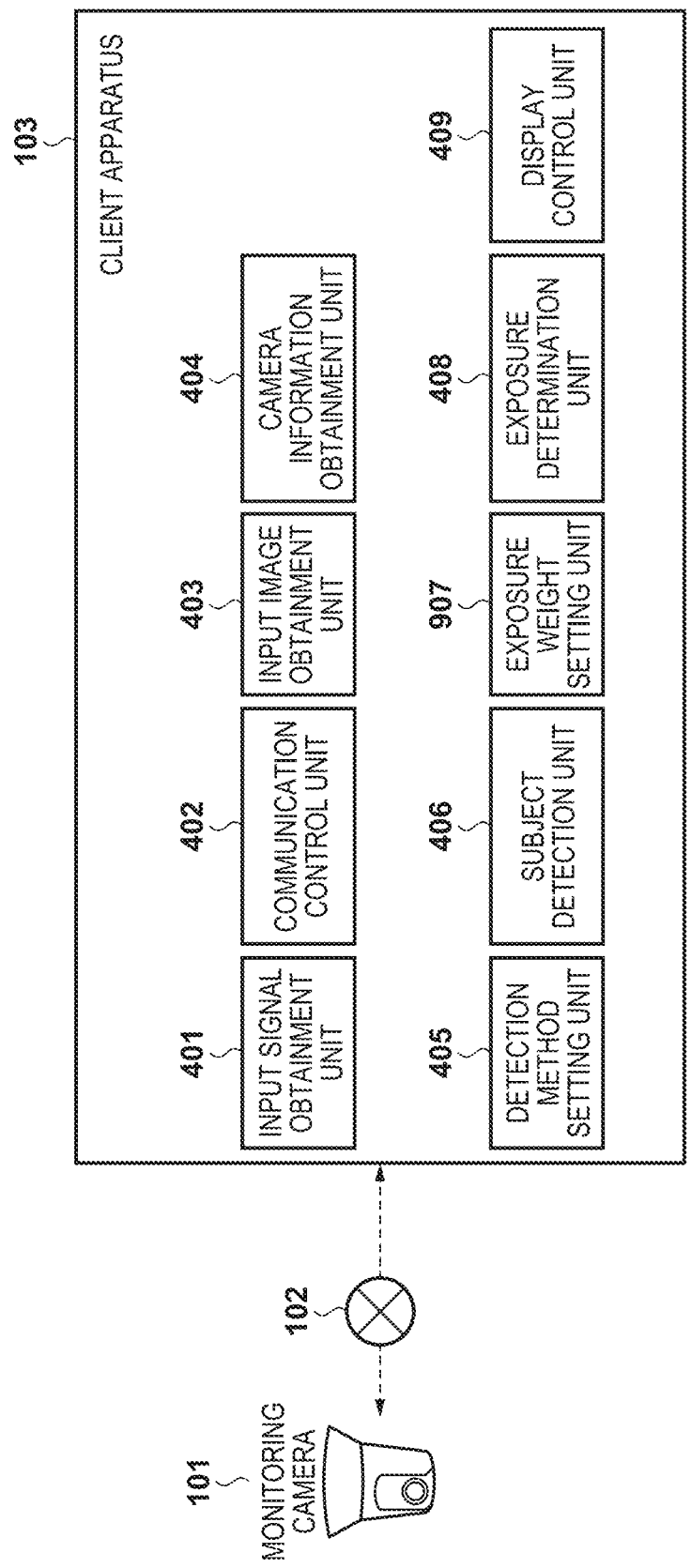
FIG. 9 is a block diagram showing a functional configuration of a client apparatus in a second embodiment.

FIG. 9 is a block diagram showing a functional configuration of a client apparatus in a second embodiment. Except for the exposure weight setting unit 907, the same reference numerals are given as in the first embodiment (FIG. 4), and a detailed description thereof is omitted.

The exposure weight setting unit 907 sets a weight distribution for calculating exposure in a face region and a human body region detected by the subject detection unit 406. Then, the exposure determination unit 408 calculates the average brightness value of the region considering the weight. More specifically, the exposure determination unit 408 calculates the number of regions of interest (the number of detected faces or human bodies), the position of the regions of interest, the size of the regions of interest, and the set weight by applying the information to Equation (4).

$$I_{object} = \frac{1}{f}\sum_{s=1}^{f}\left\{\frac{1}{k_s \times l_s}\sum_{i=-k_s/2}^{k_s/2}\cdot\sum_{j=-l_s/2}^{l_s/2}I(v_s+i, h_s+j)\times M(v_s+i, h_s+j)\right\} \quad (4)$$

Here, I (x, y) represents the brightness value of the two-dimensional coordinate position (x, y) in the horizontal direction (x-axis direction) and the vertical direction (y-axis direction) in the image. In addition, s represents an index of a region of interest, and f represents the number of regions of interest. (v, h) represents the center coordinates of the region of interest, k represents the size of the region of interest in the horizontal direction, and l represents the size of the region of interest in the vertical direction. M(x, y) represents the weight of the two-dimensional coordinate position (x, y).

FIG. 10 is a view illustrating examples of captured images where a face and a human body region are detected. An image 1000a represents a detected face region, and an image 1000b represents a detected human body region. As described also in the first embodiment, the frame calculated by the subject detection unit 406 is larger as shown by the diagonal lines in FIG. 5, and the position is shifted. In this case, the portion of the hatched region that is not the face region or the human body region has a large impact, and there are cases where the exposure of the face region or the human body region will not be appropriate.

Figure 11:
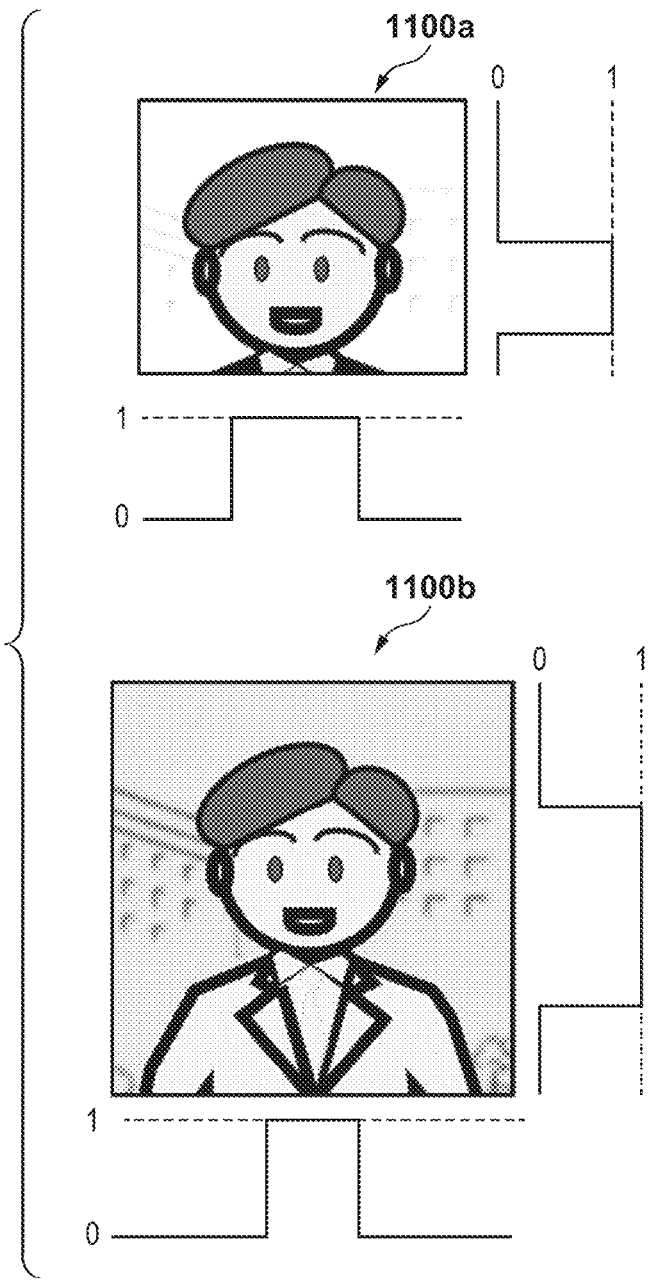
FIG. 11 is a diagram showing an example of weighting for a detected face and human body region.

FIG. 11 is a diagram showing an example of weighting for a detected face and human body region. In order to suppress fluctuation of the exposure as described above and to adjust the exposure of the face region or the human body region with high accuracy, it is conceivable to set weights as shown in the image 1100a. That is, if the main subject is a person, among the frames (faces, human body regions) calculated by the subject detection unit 406, it is conceivable to set a high weighting with respect to a region where a face or a human body actually exists. Here, the initial weight distribution is such that the section in which the head (face) of the person exists has a weight of 1 and the section in which the head does not exist has a weight of 0. Here, the weight distribution is set in four directions of up, down, left, and right.

Further, as shown in the image 1100b, the weights may be given after enlarging the image in the body direction. That is, the weight distribution is determined by extending the initial weight distribution in the torso direction (in one direction in which the lower body is present). Thus, since it is possible to increase the area of the exposure region, it is possible to realize a stable exposure even in a scene with a lot of noise and movement. In addition, when a larger region is calculated from the subject detection unit 406, weighting is set in the center with respect to the lateral direction of the face or the human body, and the weighting is shifted in the direction in which the main subject is present. That is, for the remaining three directions, the weight distribution is moved toward the center. This makes it possible to more accurately adjust the exposure in the face region or the human body region.

In order to realize stable exposure, it is conceivable to set a minimum weighting integral of the exposure region in advance so as to be equal to or larger than the set minimum weight-integrated value. The minimum weight-integrated value may still be changed according to the degree of movement of the subject and the amount of noise.

When the subject detection unit 406 detects the face region, the torso often is vertically downward from the face region. Therefore, the weighting may be extended in a direction corresponding to the vertically downward direction in the captured image. In addition, the direction in which the main subject is present may be decided from the positional relationship between the face region and the human body region. For example, the face region and the human body region are compared, and the direction that protrudes greatly becomes the torso region of the human body. Therefore, the direction in which the main subject is present becomes the direction of the torso region.

Similarly to the first embodiment, when backlight is intense as in the image 700b, the width of the weight in the lateral direction may be set relatively smaller than that of the image 700a. However, since the area of the exposure region is narrowed by this, the weighting in the direction in which the torso is present may also be increased. Further, in FIG. 11, the weight is set to a discrete value (0 or 1), but a continuous value may be used.

FIG. 12 is a flowchart of the exposure control process in the second embodiment. The same portions as those of the first embodiment (FIG. 8) are denoted by the same reference numerals, and a detailed description thereof is omitted.

In step S1207, the exposure weight setting unit 907 sets a weight from the set region of interest. In step S1208, the exposure determination unit 408 calculates the brightness value for exposure using weighting set in step S1207. Equation (4) described above is applied to the calculation of the brightness value.

In step S1209, similarly to the first embodiment, the exposure determination unit 408 calculates the difference value ΔDiff between the brightness value $I_{object}$ for exposure calculated in step S1208 and the target brightness value $I_{object\ target}$ of the region of interest. In a case where the difference ΔDiff is set to equal to or larger than the set threshold Th, it is set as a correction value of exposure with respect to the current exposure value $EV_{current}$.

As described above, according to the second embodiment, an appropriate exposure region is set from the face region or the human body region, and exposure control is performed based on the exposure region. In particular, the weighting of the exposure region to be the target of AE is changed in accordance with the state of the subject in the captured image. This makes it possible to stably set an appropriate exposure control value even in the backlight state, as in the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-151515 filed Sep. 9, 2020, which is hereby incorporated by reference herein in its entirety.

What is claimed is:

1. A control apparatus operable to control capturing by an image capturing apparatus, the control apparatus comprising:
   at least one processor; and
   a memory coupled to the at least one processor, the memory storing instructions that, when executed by the at least one processor, cause the at least one processor to:
   detect a feature portion included in an image that was captured by the image capturing apparatus; and
   determine an exposure region for calculating an exposure based on a subject region that surrounds a subject including the detected feature portion,
   wherein the exposure region is determined by extending the subject region in a first direction and reducing the subject region in a second direction different to the first direction.

2. The control apparatus according to claim 1, wherein the instructions cause the at least one processor to determine the exposure region so to have an area that is substantially the same as the subject region.

3. The control apparatus according to claim 1, wherein the instructions cause the at least one processor to determine the exposure region to be equal to or larger than a predetermined area.

4. The control apparatus according to claim 1, wherein
   the subject is a person, and
   the feature portion is at least one of an upper body, a head, a face, an eye, a nose, and a mouth, and
   the first direction is a direction in which a lower body of a person is present.

5. The control apparatus according to claim 4, wherein
   the subject region is a rectangular region that encompasses the head of a person, and
   the instructions cause the at least one processor to determine the exposure region by moving one side, among the four sides of the subject region, in a direction where a lower body of the person is present so that a neck or chest of the person is included and moving at least one the remaining three sides in a direction of a center of the subject region.

6. The control apparatus according to claim 1, the instructions further cause the at least one processor to:
   decide the first direction from a characteristic of a subject including the detected feature portion.

7. The control apparatus according to claim 1, the instructions further cause the at least one processor to:
   decide a degree of backlight in the image, and
   make a degree of reduction of the subject region in the second direction larger the larger the degree of backlight is.

8. A control apparatus operable to control capturing by an image capturing apparatus, the control apparatus comprising:
   at least one processor; and
   a memory coupled to the at least one processor, the memory storing instructions that, when executed by the at least one processor, cause the at least one processor to:
   detect a feature portion included in an image that was captured by the image capturing apparatus;
   determine a weight distribution of an exposure calculation on a subject region that surrounds a subject including the detected feature portion; and
   calculate an exposure value based on the determined weight distribution, wherein
   the weight distribution is determined by extending in a first direction an initial weight distribution set based on a section in which the subject is present.

9. The control apparatus according to claim 8, wherein the instructions cause the at least one processor to determine the weight distribution by extending the initial weight distribution in the first direction and reducing the weight distribution in a second direction different to the first direction.

10. The control apparatus according to claim 9, wherein the instructions further cause the at least one processor to:
    decide a degree of backlight in the image; and
    make a degree of reduction in the second direction in relation to the initial weight distribution larger the larger the degree of backlight is.

11. The control apparatus according to claim 8, wherein the instructions further cause the at least one processor to determine the weight distribution to be a weight-integrated value that is substantially the same as a weight-integrated value of the initial weight distribution.

12. The control apparatus according to claim 8, wherein the instructions further cause the at least one processor to determine the weight distribution to be equal to or larger than a predetermined weight-integrated value.

13. The control apparatus according to claim 8, wherein
    the subject is a person, and
    the feature portion is at least one of an upper body, a head, a face, an eye, a nose, and a mouth, and
    the first direction is a direction in which a lower body of a person is present.

14. The control apparatus according to claim 13, wherein
    the subject region is a rectangular region that encompasses the head of a person, and the initial weight distribution is set as a distribution where a section in which a head of a person is present in the subject region is given a weighting of 1 and a section where no head is present is given a weighting of 0, and the instructions cause the at least one processor to determine the weight distribution by extending a section whose weighting is 1 of a direction, among the four directions corresponding to the four sides of the subject region, where a lower body of the person is present so that a neck or chest of the person is included and moving at least one section, of a direction of the remaining three directions, whose weighting is 1 in a direction of a center of the subject region.

15. The control apparatus according to claim 8, the instructions further cause the at least one processor to decide the first direction based on a characteristic of a subject including the detected feature portion.

16. A method for controlling a control apparatus operable to control capturing by an image capturing apparatus, the method comprising:
    detecting a feature portion included in an image that was captured by the image capturing apparatus; and
    based on a subject region that surrounds a subject including the detected feature portion, determining an exposure region for calculation an exposure,
    wherein the exposure region is determined by extending the subject region in a first direction and reducing the subject region in a second direction different to the first direction.

17. A method for controlling a control apparatus operable to control capturing by an image capturing apparatus, the method comprising:
    detecting a feature portion included in an image that was captured by the image capturing apparatus;
    determining a weight distribution of an exposure calculation on a subject including the detected feature portion; and
    calculating an exposure value based on the determined weight distribution, wherein
    in the determining, the weight distribution is determined by extending in a first direction an initial weight distribution set based on a section in which the subject is present.

18. A non-transitory computer-readable recording medium storing a program for causing a computer to execute a method comprising:
    detecting a feature portion included in an image that was captured by the image capturing apparatus; and
    based on a subject region that surrounds a subject including the detected feature portion, determining an exposure region for calculating an exposure,
    wherein the exposure region is determined by extending the subject region in a first direction and reducing the subject region in a second direction different to the first direction.

19. A non-transitory computer-readable recording medium storing a program for causing a computer to execute a method comprising:
    detecting a feature portion included in an image that was captured by the image capturing apparatus;
    determining a weight distribution of an exposure calculation on a subject region that surrounds a subject including the detected feature portion; and
    calculating an exposure value based on the determined weight distribution, wherein
    the weight distribution is determined by extending in a first direction an initial weight distribution set based on a section in which the subject is present.

* * * * *